United States Patent
Niwata et al.

(10) Patent No.: US 11,973,216 B2
(45) Date of Patent: Apr. 30, 2024

(54) POSITIVE ELECTRODE ACTIVE MATERIAL AND BATTERY

(71) Applicant: MURATA MANUFACTURING CO., LTD., Kyoto (JP)

(72) Inventors: Yuki Niwata, Kyoto (JP); Asuki Yanagihara, Kyoto (JP); Ravi Gehlot, Kyoto (JP); Yosuke Hosoya, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 603 days.

(21) Appl. No.: 17/122,127

(22) Filed: Dec. 15, 2020

(65) Prior Publication Data

US 2021/0104727 A1    Apr. 8, 2021

Related U.S. Application Data

(63) Continuation of application No. PCT/JP2019/024321, filed on Jun. 19, 2019.

(30) Foreign Application Priority Data

Jun. 21, 2018  (JP) .................... 2018-117686

(51) Int. Cl.
*H01M 4/36* (2006.01)
*C01G 51/04* (2006.01)
(Continued)

(52) U.S. Cl.
CPC ............ *H01M 4/366* (2013.01); *C01G 51/04* (2013.01); *H01M 4/485* (2013.01); *H01M 4/525* (2013.01);
(Continued)

(58) Field of Classification Search
CPC ...... H01M 4/366; H01M 4/485; H01M 4/525; H01M 10/0525; C01G 51/04
See application file for complete search history.

(56) References Cited

U.S. PATENT DOCUMENTS

| 7,563,540 B2 | 7/2009 | Han et al. |
| 2005/0019661 A1 | 1/2005 | Han et al. |

(Continued)

FOREIGN PATENT DOCUMENTS

| JP | H076753 A | 1/1995 |
| JP | H11242959 A | 9/1999 |

(Continued)

OTHER PUBLICATIONS

International Search Report for Application No. PCT/JP2019/024321, dated Sep. 10, 2019.
(Continued)

*Primary Examiner* — Nathanael T Zemui
(74) *Attorney, Agent, or Firm* — K&L Gates LLP

(57) ABSTRACT

A positive electrode active material includes positive electrode active material particles including a composite oxide with a hexagonal crystal structure. The composite oxide includes Li, Co, and at least one element M1 selected from the group consisting of Ni, Fe, Pb, Mg, Al, K, Na, Ca, Si, Ti, Sn, V, Ge, Ga, B, As, Zr, Mn and Cr, and the at least one element M1 is provided on a surface of the positive electrode active material particles. An atomic ratio of a total amount of the at least one element M1 to an amount of Co on the surface of the positive electrode active material particles is from 0.6 to 1.3.

7 Claims, 4 Drawing Sheets

(51) Int. Cl.
H01M 4/485 (2010.01)
H01M 4/505 (2010.01)
H01M 4/525 (2010.01)
H01M 10/0525 (2010.01)

(52) U.S. Cl.
CPC ..... *H01M 10/0525* (2013.01); *C01P 2002/74* (2013.01); *H01M 4/505* (2013.01)

(56) References Cited

U.S. PATENT DOCUMENTS

| | | |
|---|---|---|
| 2017/0187035 A1 | 6/2017 | Yanagihara et al. |
| 2017/0207444 A1 | 7/2017 | Yanagihara et al. |
| 2018/0079655 A1 | 3/2018 | Dai et al. |

FOREIGN PATENT DOCUMENTS

| | | |
|---|---|---|
| JP | 2005044785 A | 2/2005 |
| JP | 2016081716 A | 5/2016 |

OTHER PUBLICATIONS

European Search Report dated Mar. 7, 2022 in corresponding European Application No. 19823078.1.
Chinese Office Action issued Dec. 1, 2023 in corresponding Chinese Application No. 201980041486.4.

POSITIVE ELECTRODE ACTIVE MATERIAL AND BATTERY

CROSS REFERENCE TO RELATED APPLICATIONS

The present application is a continuation of PCT patent application no. PCT/JP2019/024321, filed on Jun. 19, 2019, which claims priority to Japanese patent application no. JP2018-117686 filed on Jun. 21, 2018, the entire contents of which are being incorporated herein by reference.

BACKGROUND

The present technology generally relates to a positive electrode active material and a battery.

It has been studied to determine a practical limit of a positive electrode active material that has been used conventionally, and expand a practical range to just before the limit to increase the capacity and energy density of the battery. For example, in recent years, development has been underway to raise the upper limit of a use potential of lithium cobalt oxide ($LiCoO_2$) (that is, to increase a battery charging pressure) to remove and insert more lithium, and thus to increase a charge/discharge capacity.

Since a crystal structure on a surface of positive electrode active material particles has a great influence on a battery reaction, various studies have been conducted on the crystal structure on the surface of the particles.

SUMMARY

The present technology generally relates to a positive electrode active material and a battery.

In recent years, simultaneous achievement of charge/discharge cycle characteristics and storage characteristics has been desired. In particular, when charging and discharging are repeated by raising the upper limit of the use potential, reactivity at an interface between a positive electrode active material and an electrolytic solution tends to increase as an amount of Li drawn increases, the positive electrode active material and the electrolytic solution tend to deteriorate during charging, and there has been a problem that the charge/discharge cycle characteristics and the storage characteristics significantly deteriorate.

It is difficult to achieve both the charge/discharge cycle characteristics and the storage characteristics, and it is desired to achieve both of these characteristics.

An object of the present technology is to provide a positive electrode active material and a battery capable of achieving both charge/discharge cycle characteristics and storage characteristics.

According to an embodiment of the present technology, a positive electrode active material is provided. The positive electrode active material includes positive electrode active material particles including a composite oxide with a hexagonal crystal structure. The composite oxide includes Li, Co, and at least one element M1 selected from the group consisting of Ni, Fe, Pb, Mg, Al, K, Na, Ca, Si, Ti, Sn, V, Ge, Ga, B, As, Zr, Mn and Cr, the at least one element M1 is provided on a surface of the positive electrode active material particles, an atomic ratio (total amount of at least one element M1/Co amount) of a total amount of the at least one element M1 to an amount of Co on the surface of the positive electrode active material particles is from 0.6 to 1.3, a half-value width of a peak of an $A_{1g}$ vibration mode of the hexagonal crystal structure in a Raman spectrum is from 10 $cm^{-1}$ to 17 $cm^{-1}$, and a peak intensity ratio $IA_{1g\text{-}H}/IE_g$ of a peak intensity $IA_{1g\text{-}H}$ of the $A_{1g}$ vibration mode of the hexagonal crystal structure in the Raman spectrum and a peak intensity $IE_g$ of an $E_g$ vibration mode of the hexagonal crystal structure is from 1.1 to 1.9.

According to an embodiment of the present technology, the "surface of the positive electrode active material particles" refers to a region having a depth of 5 nm or less from an outermost surface of the positive electrode active material particles.

According to an embodiment of the present technology, a battery is provided. The battery includes a positive electrode including the positive electrode active material, a negative electrode, and an electrolyte. The positive electrode active material has similar configuration as the positive electrode active material in the embodiments as described herein.

According to the present technology, both charge/discharge cycle characteristics and storage characteristics can be achieved. It should be understood that the effects described here are not necessarily limited, and may be any one of the effects described in the present disclosure or effects different therefrom.

DETAILED DESCRIPTION

As described herein, the present disclosure will be described based on examples with reference to the drawings, but the present disclosure is not to be considered limited to the examples, and various numerical values and materials in the examples are considered by way of example.

According to the present disclosure, in positive electrode active material particles containing a composite oxide having a hexagonal crystal structure, a surface state of the positive electrode active material particles greatly affects charge/discharge cycle characteristics (hereinafter simply referred to as "cycle characteristics") and storage characteristics. Based on the above findings, in order to achieve both cycle characteristics and storage characteristics, the present inventors have intensively studied positive electrode active material particles containing a composite oxide having a hexagonal crystal structure, and the composite oxide including Li, Co, and at least one element M1 selected from the group consisting of Ni, Fe, Pb, Mg, Al, K, Na, Ca, Si, Ti, Sn, V, Ge, Ga, B, As, Zr, Mn and Cr. As a result, it has been found that the content and crystal structure of at least one element M1 on the surface of the positive electrode active material particles are defined.

Specifically, it has been found that the content and crystal structure are defined as follows, (A) When an atomic ratio (total amount of at least one element M1/Co amount) of an amount of Co on the surface of the positive electrode active material particles and a total amount of at least one element M1 is 0.6 or more and 1.3 or less, the content of the at least one element M1 on the surface of the positive electrode active material particles is defined. (B) When a half-value width of a peak of an $A_{1g}$ vibration mode of the hexagonal crystal structure in a Raman spectrum is 10 cm$^{-1}$ or more and 17 cm$^{-1}$ or less, and a peak intensity ratio $IA_{1g\text{-}H}/IE_g$ of a peak intensity $IA_{1g\text{-}H}$ of the $A_{1g}$ vibration mode of the hexagonal crystal structure in the Raman spectrum and a peak intensity $IE_g$ of an $E_g$ vibration mode of the hexagonal crystal structure is 1.1 or more and 1.9 or less, the crystal structure on the surface of the positive electrode active material particles is defined.

Figure 1:
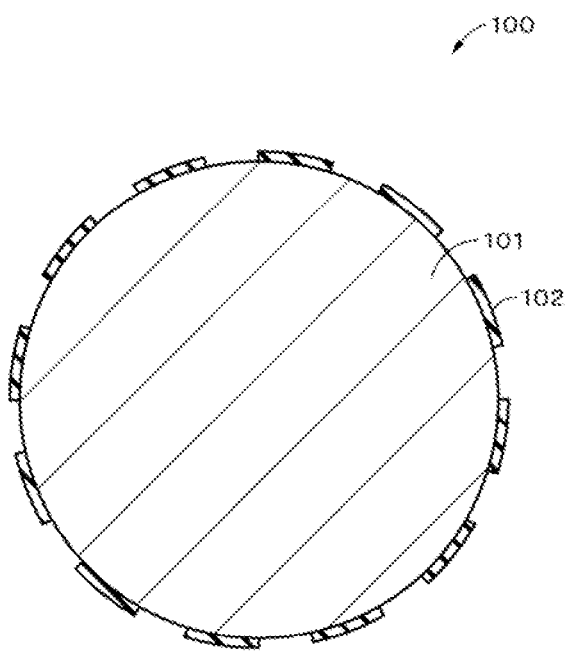
FIG. 1 is a sectional view showing an example of a configuration of a positive electrode active material according to an embodiment of the present technology.

FIG. 1 shows an example of a configuration of the positive electrode active material according to the first embodiment of the present invention. The positive electrode active material according to the first embodiment is a positive electrode active material for a so-called non-aqueous electrolyte secondary battery, and contains a powder of surface-coated positive electrode active material particles 100. The surface-coated positive electrode active material particle 100 includes a core particle 101 and a spinel phase 102 present on at least a portion of the surface of the core particle 101. As described above, the presence of the spinel phase 102 on at least a portion of the surface of the core particle 101 can suppress decomposition of the positive electrode active material in a high temperature environment. In the present specification, "decomposition of the positive electrode active material" means a reaction or the like in which oxygen or the like is released due to elution of transition metal ions such as cobalt and a part of the crystal structure is rendered defective.

A positive electrode potential (vsLi/Li$^+$) in a fully charged state of the battery to which the positive electrode active material according to the first embodiment is applied preferably exceeds 4.20 V, more preferably is 4.25 V or more, and still more preferably 4.40 V or more, particularly preferably 4.45 V or more, and most preferably 4.50 V or more. When the positive electrode active material according to the first embodiment is applied to a battery having a positive electrode potential exceeding 4.20 V in a fully charged state, the effect of achieving both cycle characteristics and storage characteristics becomes particularly remarkable. The upper limit of the positive electrode potential (vsLi/Li$^+$) in the fully charged state is not particularly limited, but is preferably 6 V or less, more preferably 4.6 V or less.

Here, a configuration in which the positive electrode active material particle 100 includes the spinet phase 102 on the surface of the core particle 101 will be described. However, the spinel phase 102 may not be included. However, from the viewpoint of suppressing the decomposition of the positive electrode active material in a high temperature environment, it is preferable that the positive electrode active material particle 100 contain the spinel phase 102 on the surface of the core particle 101.

The core particle 101 is capable of inserting and extracting lithium, which is an electrode reactant, and contains a composite oxide having a hexagonal-crystal layered rock salt type structure. The composite oxide is a so-called lithium transition metal composite oxide and specifically includes Li, Co, and at least one element M1 selected from the group consisting of Ni, Fe, Pb, Mg, Al, K, Na, Ca, Si, Ti, Sn, V, Ge, Ga, B, As, Zr, Mn and Cr. A lithium transition metal oxide preferably contains Co as a main component.

Here, "containing Co as a main component" means that an atomic ratio of Co to a total amount of metal elements contained in the composite oxide is 50% or more.

It is preferable that the composite oxide have an average composition represented by the following formula (1): $Li_xCo_yM1_{1-y}O_2$ ... (1) (in the formula (1), M1 includes at least one element selected from the group consisting of Ni, Fe, Pb, Mg, Al, K, Na, Ca, Si, Ti, Sn, V, Ge, Ga, B, As, Zr, Mn and Cr. x and y satisfy $0.95 \leq x \leq 1.0$ and $0 < y < 1$.)

Crystallinity on the surface of the core particle 101 is preferably lower than crystallinity inside the core particle 101. More specifically, it is preferable that the crystallinity of the positive electrode active material particle 100 decrease from the surface of the positive electrode active material particle 100 toward the inside. In this case, the crystallinity may gradually change from the surface of the positive electrode active material particle 100 toward the inside, or may change rapidly in a stepped manner or the like. When the crystallinity on the surface of the core particle 101 is low as described above, a strain of the lattice and crystallite in the core particle 101 caused by Li insertion/elimination reaction accompanied by phase transition can be relaxed, so that the cycle characteristics can be further improved. In the present specification, the "surface of the core particle 101" refers to a region having a depth of 5 nm or less from an outermost surface of the core particle 101, and the "inside of the core particle 101" refers to a region having a depth exceeding 5 nm from the outermost surface of the core particle 101.

When the spinel phase 102 is present on a portion of the surface of the core particle 101 in an island-like or mottled shape, a portion of the surface of the core particle 101 may be exposed from the spinet phase 102. When a portion of the surface of the core particle 101 is thus exposed, lithium ions can move between the core particle 101 and an electrolytic solution without being hindered by the spinel phase 102 through this exposed portion. Therefore, an increase in resistance can be suppressed, and the cycle characteristics can be further improved.

The spinel phase 102 contains an oxide containing Li and at least one element M1 described above. From the viewpoint of improving the cycle characteristics and the storage characteristics, it is particularly preferable that this oxide include at least one element selected from the group consisting of Mg, Al and Ti among the elements M1. All of the elements M1 contained in the core particle 101 and the spinel phase 102 may be common, some of the elements M1 contained in the core particle 101 and the spinet phase 102 may be common, or all of the elements M1 contained in the core particle 101 and the spinel phase 102 do not have to be common.

It is preferable that the spinel phase 102 have an average composition represented by the following formula (2): $Co_xM2_{3-x}O_4$ ... (2) (provided that in the formula (2), M2 includes at least one element selected from the group consisting of Ni, Fe, Pb, Mg, Al, K, Na, Ca, Si, Ti, Sn, V, Ge, Ga, B, As, Zr, Mn and Cr. x satisfies $0 < X < 1$.)

The crystal structure of the positive electrode active material particles 100 may gradually change from the spinet phase (spinel type crystal structure) 102 to the hexagonal-crystal layered rock salt type structure from the surface of the positive electrode active material particles 100 toward the inside, or may change rapidly in a stepped manner or the like.

The positive electrode active material particles 100 preferably further contain a compound containing at least one element M2 selected from the group consisting of S, P and F. When the positive electrode active material particles 100 thus further contain the compound containing at least one element M2, it is possible to improve performance deterioration and long-term cycle characteristics particularly during long-term storage.

Since the compound containing at least one element M2 functions outside a crystal system of the composite oxide, it is preferable that the compound be present on at least one of the surface of the positive electrode active material particles 100 and a crystal grain boundary of the positive electrode active material particles 100. However, the compound of the element M2 may be present on the surface of the positive electrode active material particles 100 and at a portion other than the crystal grain boundary of the positive electrode active material particles 100. When the compound of the element M2 is present on the surface of the positive electrode active material particles 100, the compound of the element M2 may be dotted on the surface of the positive electrode active material particles 100, or the surface of the positive electrode active material particles 100 may be covered with the compound of the element M2. Here, in the covering, the surface of the positive electrode active material particles 100 may be partially covered, or the entire surface of the positive electrode active material particles 100 may be covered.

At least one element M1 is present on the surface of the positive electrode active material particles 100 in a specified ratio. Specifically, the atomic ratio (total amount of at least one element M1/Co amount) of the amount of Co on the surface of the positive electrode active material particles 100 and the total amount of at least one element M1 is 0.6 or more and 1.3 or less, and preferably 0.8 or more and 1.1 or less. If the atomic ratio (M1/Co) is less than 0.6, the amount of the element M1 present on the surface of the positive electrode active material particles 100 is too small, and a function of stabilizing the crystal structure is deteriorated. Therefore, there is a risk that the cycle characteristics and storage characteristics cannot be achieved simultaneously. On the other hand, when the atomic ratio (M1/Co) exceeds 1.3, the amount of the element M1 present on the surface of the positive electrode active material particles 100 is too large, transition metals such as cobalt are relatively reduced, and conductivity of the particles is lowered. Since a resistance component increases, the cycle characteristics may deteriorate. In the present specification, the "surface of the positive electrode active material particles 100" refers to a region having a depth of 5 nm or less from an outermost surface of the positive electrode active material particles 100. The "inside of the positive electrode active material particles 100" refers to a region having a depth exceeding 5 nm from the outermost surface of the positive electrode active material particles 100.

Since the element M1 functions on the surface side of the positive electrode active material particles 100, the concentration of the element M1 on the surface of the positive electrode active material particles 100 is preferably higher than the concentration of the element M1 inside the positive electrode active material particles 100. More specifically, it is preferable that the concentration of the element M1 in the positive electrode active material particle 100 decrease from the surface of the positive electrode active material particle 100 toward the inside. In this case, the concentration of the element M1 may gradually change from the surface of the positive electrode active material particle 100 toward the inside, or may change rapidly in a stepped manner or the like. The composition in the core particle 101 is preferably uniform. This is because if the composition in the core particle 101 changes, an effect of stabilizing the crystal structure by adding the element M1 varies between a center portion and an outer surface portion of the core particle 101, which may adversely affect the cycle characteristics.

A region (hereinafter referred to as the "high concentration region of the element M1") containing a high concentration of the element M1 on the surface of the positive electrode active material particles 100 functions to suppress decomposition of the positive electrode active material in a high temperature environment. However, since the decomposition proceeds near the surface of the particles, it is preferable that the high concentration region of the element M1 be present on the entire surface of the positive electrode active material particles 100. However, even if the high concentration regions of the element M1 are dotted on the surface of the positive electrode active material particles 100, the above-mentioned function of suppressing the decomposition of the positive electrode active material can be sufficiently exerted. Here, the "high concentration region of the element M1" refers to a region in which the atomic ratio (total amount of at least one element M1/Co amount) of the amount of Co and the total amount of at least one element M1 is 0.6 or more and 1.3 or less.

Figure 2:
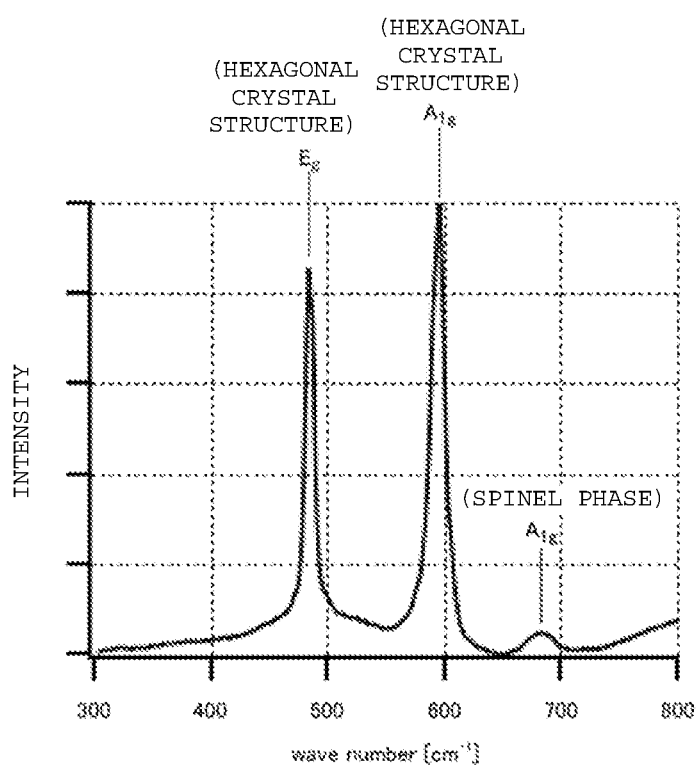
FIG. 2 is a graph showing an example of a Raman spectrum of the positive electrode active material according to an embodiment of the present technology.

FIG. 2 shows an example of a Raman spectrum of the positive electrode active material according to the first embodiment of the present invention. In the Raman spectrum of the positive electrode active material, a peak of an $E_g$ vibration mode of a hexagonal crystal structure is observed near 480 cm$^{-1}$, and a peak of an $A_{1g}$ vibration mode of the hexagonal crystal structure is observed near 590 cm$^{-1}$. The $E_g$ vibration mode belongs to O—Co—O bending, and the $A_{1g}$ vibration mode belongs to Co—O stretching. The peak of the $A_{1g}$ vibration mode of the spinel phase 102 is observed in a range of 600 cm$^{-1}$ or more and 700 cm$^{-1}$ or less.

A half-value width of the peak of the $A_{1g}$ vibration mode of the hexagonal crystal structure in the Raman spectrum is 10 cm$^{-1}$ or more and 17 cm$^{-1}$ or less, preferably 12 cm$^{-1}$ or more and 15 cm$^{-1}$ or less. Here, the half-value width means a full width at half maximum (FWHM). If the half-value width is less than 10 cm$^{-1}$, the crystallinity of the surface of the positive electrode active material particles 100 is high, so that good storage characteristics can be obtained; however, the cycle characteristics may deteriorate. On the other hand, when the half-value width exceeds 17 cm$^{-1}$, the crystallinity of the surface of the positive electrode active material particles 100 is low, so that good cycle characteristics can be obtained; however, the storage characteristics may deteriorate.

A peak intensity ratio $IA_{1g-H}/IE_g$ of a peak intensity $IA_{1g-H}$ of the $A_{1g}$ vibration mode of the hexagonal crystal structure in the Raman spectrum and a peak intensity $IE_g$ of the $E_g$ vibration mode of the hexagonal crystal structure is 1.1 or more and 1.9 or less, preferably 1.3 or more and 1.7 or less. If the peak intensity ratio $IA_{1g-H}/IE_g$ is less than 1.1, the crystallinity of the surface of the positive electrode active material particles 100 is low, so that good cycle characteristics can be obtained; however, the storage characteristics may deteriorate. On the other hand, when the peak intensity ratio $IA_{1g-H}/IE_g$ exceeds 1.9, the crystallinity of the surface of the positive electrode active material particles 100 is high, so that good storage characteristics can be obtained; however, the cycle characteristics may deteriorate.

A peak intensity ratio $IA_{1g-S}/IA_{1g-H}$ of a peak intensity $IA_{1g-S}$ of the $A_{1g}$ vibration mode of the spinel phase 102 in the Raman spectrum and a peak intensity $IA_{1g-H}$ of the $A_{1g}$ vibration mode of the hexagonal crystal structure is preferably 0.04 or less. The spinel phase is generated when the amount of Li element on the surface of the positive electrode active material particles 100 is small in synthesis of composite oxide particles. However, the positive electrode active material particles 100 synthesized in such a state are preferable because a distribution of the added element M1 tends to be particularly uneven near the surface. Therefore, it is preferable that the spinel phase be present to an extent that it can be observed when locally observed by, for example, a transmission electron microscope (TEM). However, in the Raman spectrum, when the peak intensity ratio $IA_{g-S}/IA_{g-H}$ exceeds 0.04, the amount of the spinel phase 102 present on the surface of the core particle 101 is too large, so that the increase in resistance may deteriorate the cycle characteristics and the storage characteristics.

The positive electrode active material according to the first embodiment of the present invention is prepared, for example, as follows. First, a powder of composite oxide particles containing Li, Co, and at least one element M1 and having the hexagonal-crystal layered rock salt type structure is prepared. Subsequently, a mixture is obtained by mixing the prepared composite oxide particle powder, lithium carbonate, cobalt oxide, and at least one compound selected from the group consisting of Ni-containing compound, Fe-containing compound, Pb-containing compound, Mg-containing compound, Al-containing compound, K-containing compound, Na-containing compound, Ca-containing compound, Si-containing compound, Ti-containing compound, Sn-containing compound, V-containing compound, Ge-containing compound, Ga-containing compound, B-containing compound, As-containing compound, Zr-containing compound, Mn-containing compound and Cr-containing compound. At this time, the compounding ratio of each material is adjusted so that the atomic ratio (total amount of at least one element M1/Co amount) of the amount of Co on the surface of the positive electrode active material particles 100 to be obtained finally and the total amount of at least one element M1 is 0.6 or more and 1.3 or less. Instead of lithium carbonate, at least one of lithium phosphate, lithium fluoride and lithium sulfide may be used. Next, the mixture is stirred at high speed, heat-treated under an air stream, for example, and then finely pulverized. As a result, the positive electrode active material according to the first embodiment is obtained.

The processing time for high-speed stirring is preferably 2 hours or more and 5 hours or less. If the processing time for high-speed stirring is less than 2 hours, the peak intensity ratio $IA_{1g-H}/IE_g$ may be less than 1.1. On the other hand, if the processing time for high-speed stirring exceeds 5 hours, the peak intensity ratio $IA_{1g-H}/IE_g$ may exceed 1.9.

The heat treatment temperature is preferably 750° C. or higher and 850° C. or lower. If a heat treatment temperature is less than 750° C., the half-value width of the peak of the $A_{1g}$ vibration mode of the hexagonal crystal structure may be less than 10 cm$^{-1}$. On the other hand, if the heat treatment temperature exceeds 850° C., the half-value width of the peak of the $A_{1g}$ vibration mode of the hexagonal crystal structure may exceed 17 cm$^{-1}$.

The positive electrode active material according to the first embodiment contains a powder of the surface-coated positive electrode active material particles 100. The positive electrode active material particle 100 includes the core particle 101 and the spinel phase 102 present on at least a portion of the surface of the core particle 101. The core particles 101 include the positive electrode active material particles 100 containing a composite oxide having a hexagonal crystal structure. The above composite oxide includes Li, Co, and at least one element M1 selected from the group consisting of Ni, Fe, Pb, Mg, Al, Na, Ca, Si, Ti, Sn, V, Ge, Ga, B, As, Zr, Mn and Cr. The spinel phase 102 contains an oxide containing Li and at least one element M1. The atomic ratio (total amount of at least one element M1/Co amount) of the amount of Co on the particle surface and the total amount of at least one element M1 is 0.6 or more and 1.3 or less, the half-value width of the peak of the $A_{1g}$ vibration mode of the hexagonal crystal structure in the Raman spectrum is 10 cm$^{-1}$ or more and 17 cm$^{-1}$ or less, and the peak intensity ratio $IA_{1g-H}/IE_g$ of the peak intensity $IA_{1g-H}$ of the $A_{1g}$ vibration mode of the hexagonal crystal structure in the Raman spectrum and the peak intensity $IE_g$ of the $E_g$ vibration mode of the hexagonal crystal structure is 1.1 or more and 1.9 or less. As a result, both the cycle characteristics and the storage characteristics can be achieved.

Using the positive electrode active material according to the first embodiment of the present invention, it is possible to produce non-aqueous electrolyte secondary batteries (hereinafter, simply referred to as the "battery") of various shapes and sizes. An example of a battery using the positive electrode active material according to the first embodiment of the present invention will be described below.

Figure 3:
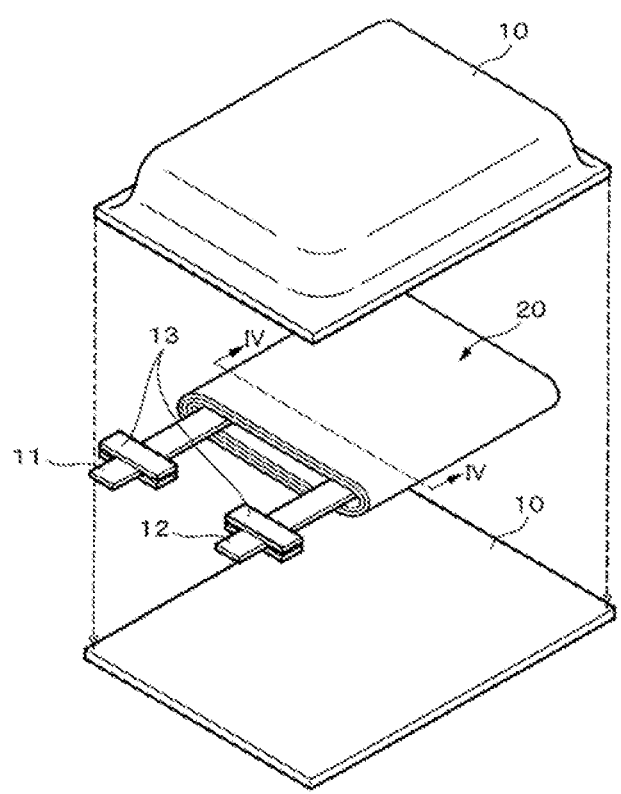
FIG. 3 is an exploded perspective view showing an example of a configuration of a nonaqueous electrolyte secondary battery according to an embodiment of the present technology.

FIG. 3 shows an example of a battery configuration according to a second embodiment of the present invention. The battery according to the second embodiment is a so-called laminated battery. In this battery, an electrode body 20 having a positive electrode lead 11 and a negative electrode lead 12 installed therein is housed in a film-shaped outer package material 10, and the battery can be smaller, lighter, and thinner.

Each of the positive electrode lead 11 and the negative electrode lead 12 goes from an inside of the outer package material 10 to an outside of the outer package material 10, and for example, is led out in the same direction. The positive electrode lead 11 and the negative electrode lead 12 are each made of a metal material such as Al, Cu, Ni, or stainless steel, and have a thin plate shape or a network shape.

The outer package material 10 is made of, for example, a rectangular aluminum laminated film obtained by sticking a nylon film, an aluminum foil and a polyethylene film in this order. For example, the outer package material 10 is disposed such that a side of the polyethylene film faces the electrode body 20, and outer peripheral portions thereof are in close contact with each other by fusion or an adhesive. An adhesive film 13 is inserted between the outer package material 10 and each of the positive electrode lead 11 and the negative electrode lead 12 in order to prevent entrance of the outside air. The adhesive film 13 is made of a material having adhesion to each of the positive electrode lead 11 and the negative electrode lead 12, for example, a polyolefin resin such as polyethylene, polypropylene, modified polyethylene, or modified polypropylene.

The outer package material 10 may be made of a laminated film having another structure, a polymer film such as polypropylene, or a metal film in place of the above-described aluminum laminated film. Alternatively, the outer package material 10 may be made of a laminated film having a polymer film stacked on one surface or each of both surfaces of an aluminum film as a core material.

Figure 4:
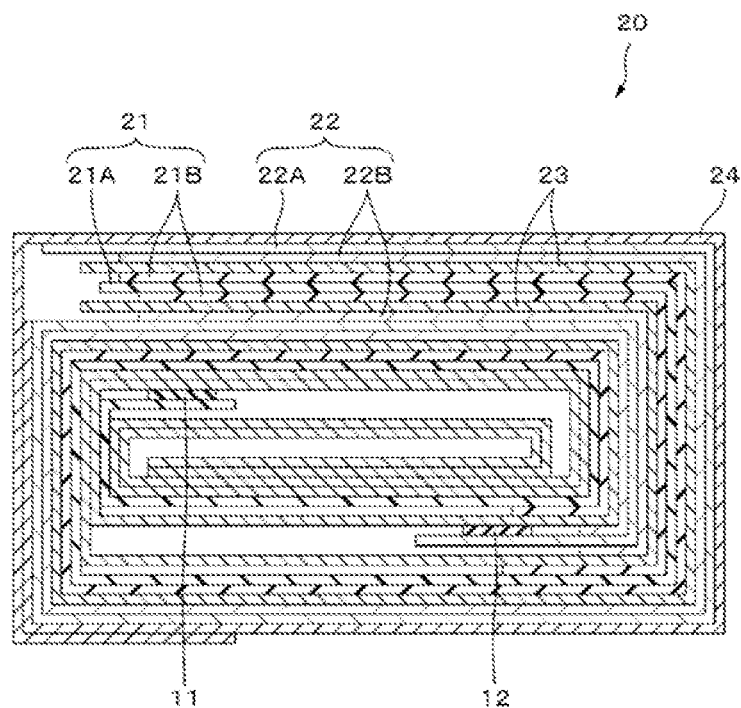
FIG. 4 is a sectional view taken along line IV-IV of FIG. 3.

FIG. 4 is a cross-sectional view of the electrode body 20 shown in FIG. 3 taken along line IV-IV. The electrode body 20 is of a winding type, and has a structure in which a positive electrode 21 and a negative electrode 22 both having an elongated shape are stacked via a separator 23 having an elongated shape and wound in a flat and spiral shape. An outermost periphery of the electrode body 20 is protected by a protective tape 24. An electrolytic solution as an electrolyte is injected into the outer package material 10 and impregnated in the positive electrode 21, the negative electrode 22, and the separator 23.

Hereinafter, the positive electrode 21, the negative electrode 22, the separator 23, and the electrolytic solution constituting the battery will be sequentially described.

The positive electrode 21 includes, for example, a positive electrode current collector 21A and a positive electrode active material layer 21B provided on both surfaces of the positive electrode current collector 21A. The positive electrode current collector 21A is made of, for example, a metal foil such as an aluminum foil, a nickel foil, or a stainless steel foil. The positive electrode active material layer 21B contains a positive electrode active material. The positive electrode active material layer 21B may further contain at least one of a binder and a conductive agent, if necessary.

The positive electrode active material is the positive electrode active material according to the first embodiment described above.

As a binder, for example, at least one selected from the group consisting of resin materials such as polyvinylidene fluoride, polytetrafluoroethylene, polyacrylonitrile, styrene-butadiene rubber, and carboxymethyl cellulose, copolymers mainly containing these resin materials, and the like is used.

As the conductive agent, for example, at least one carbon material selected from the group consisting of graphite, carbon fiber, carbon black, Ketjen black, carbon nanotube, and the like is used. The conductive agent may be a material having conductivity, and is not limited to the carbon material. For example, a metal material, a conductive polymer material, or the like may be used as the conductive agent.

The negative electrode 22 includes, for example, a negative electrode current collector 22A and a negative electrode active material layer 22B provided on both surfaces of the negative electrode current collector 22A. The negative electrode current collector 22A is made of, for example, a metal foil such as a copper foil, a nickel foil, or a stainless steel foil.

The negative electrode active material layer 22B contains one or two or more kinds of negative electrode active materials capable of inserting and extracting lithium. The negative electrode active material layer 22B may further contain at least one of a binder and a conductive agent, if necessary.

In this battery, the electrochemical equivalent of the negative electrode 22 or the negative electrode active material is greater than the electrochemical equivalent of the positive electrode 21, and it is theoretically preferable that lithium metal do not precipitate on the negative electrode 22 during charging.

Examples of the negative electrode active material include carbon materials such as hardly graphitizable carbon, easily graphitizable carbon, graphite, pyrocarbons, cokes, glassy carbons, organic polymer compound burnt body, carbon fiber, and activated carbon. Among these, examples of the cokes include pitch coke, needle coke, petroleum coke and the like. The organic polymer compound burnt body refers to a carbonized material obtained by baking a polymer material such as a phenol resin or a furan resin at an appropriate temperature. Some of such carbonized materials are classified as hardly graphitizable carbon or easily graphitizable carbon. These carbon materials are preferred because they exhibit very little change in their crystal structures during charging and discharging, and provide a high charge/discharge capacity and excellent cycle characteristics. Graphite is especially preferred, as it has a large electrochemical equivalent and provides a high energy density. Further, hardly graphitizable carbon is preferable because it provides excellent cycle characteristics. Furthermore, it is preferable to use a carbon material having a low charge/discharge potential, specifically, a carbon material having a charge/discharge potential that is close to that of lithium metal, because the higher energy density can be easily realized for the battery.

Examples of other negative electrode active materials capable of increasing the capacity include materials containing at least one of a metal element and a metalloid element as a constituent element (for example, an alloy, a compound or a mixture). This is because a high energy density can be obtained by using such a material. In particular, it is more preferred to use such a negative electrode active material together with a carbon material because this enables a high energy density as well as excellent cycle characteristics to be obtained. In the present invention, the alloy includes, in addition to materials made of two or more kinds of metal elements, materials containing one or more kinds of metal elements and one or more kinds of metalloid elements. Further, the alloy may contain a non-metal element. The compositional structure of the alloy includes a solid solution, a eutectic (eutectic mixture), an intermetallic compound, and a material in which two or more kinds of these coexist.

Examples of such a negative electrode active material include a metallic element and a metalloid element capable of forming an alloy with lithium, Specific examples include Mg, B, Al, Ti, Ga, In, Si, Ge, Sn, Pb, Bi, Cd, Ag, Zn, Hf, Zr, Y Pd and Pt. These materials may be crystalline or amorphous.

The negative electrode active material preferably contains, as a constituent element, a metal element or a metalloid element of 4B group in the short periodical table. The negative electrode active material more preferably contains at least one of Si and Sn as a constituent element. This is because Si and Sn each have a high capability of inserting and extracting lithium, so that a high energy density can be obtained. Examples of such a negative electrode active material include an elemental substance, alloy and compound of Si, an elemental substance, alloy and compound of Sn, and a material partially having one kind or two or more kinds of these.

Examples of Si alloys include an alloy that includes at least one kind selected from the group consisting of Sn, Ni, Cu, Fe, Co, Mn, Zn, In, Ag, Ti, Ge, Bi, Sb, Nb, Mo, Al, P, Ga, and Cr as a second constituent element other than Si. Examples of Sn alloys include an alloy that includes at least one kind selected from the group consisting of Si, Ni, Cu, Fe, Co, Mn, Zn, In, Ag, Ti, Ge, Bi, Sb, Nb, Mo, Al, P, Ga, and Cr as a second constituent element other than Sn.

Examples of Sn compounds or Si compounds include those containing O or C as a constituent element. These compounds may contain the second constituent element described above.

Among them, the Sn-based negative electrode active material preferably contains Co, Sn, and C as constituent elements and has a low crystalline structure or an amorphous structure.

Examples of the other negative electrode active materials include metal oxides and polymer compounds capable of inserting and extracting lithium. Examples of the metal oxides include lithium titanium oxide containing Li and Ti such as lithium titanate ($Li_4Ti_5O_{12}$), iron oxide, ruthenium oxide, and molybdenum oxide. Examples of the polymer compounds include polyacetylene, polyaniline, and polypyrrole.

As a binder, the binder as that for the positive electrode active material layer 21B can be used.

As a conductive agent, the conductive agent as that for the positive electrode active material layer 21B can be used.

The separator 23 isolates the positive electrode 21 and the negative electrode 22 from each other to prevent short circuit of a current due to contact between both the electrodes, and allows a lithium ion to pass therethrough. The separator 23 is formed of, for example, a porous film made of polytetrafluoroethylene, polyolefin resin (such as polypropylene (PP) or polyethylene (PE)), acrylic resin, styrene resin, polyester resin or nylon resin, or a resin obtained by blending these resins, and may be a laminate of porous films formed of two or more of these resin materials.

Among these, the porous film made of polyolefin is preferable, since such a film has a superior short circuit preventive effect and can improve safety of the battery by shutdown effect. In particular, polyethylene is preferable as a material for constituting the separator 23, since polyethylene can provide shutdown effect in a range of 100° C. or higher and 160° C. or lower and has superior electrochemical stability. Among them, low density polyethylene, high density polyethylene, and linear polyethylene are preferably used because they have an appropriate melting temperature and are easily available. In addition, it is possible to use a material obtained by copolymerizing or blending a resin having chemical stability with polyethylene or polypropylene. Alternatively, the porous film may have a structure of three or more layers in which a polypropylene layer, a polyethylene layer, and a polypropylene layer are sequentially stacked. For example, it is desirable to have a three-layer structure of PP/PE/PP and set a mass ratio [wt %] of PP to PE to PP:PE=60:40 to 75:25. Alternatively, from the viewpoint of cost, a single-layer substrate having 100 wt % PP or 100 wt % PE may be used. A method for producing the separator 23 may be wet or dry.

A nonwoven fabric may be used as the separator 23. As the fibers constituting the nonwoven fabric, aramid fibers, glass fibers, polyolefin fibers, polyethylene terephthalate (PET) fibers, nylon fibers, or the like can be used. Alternatively, these two or more kinds of fibers may be mixed to form a nonwoven fabric.

The separator 23 may have a configuration including a substrate and a surface layer provided on one or both surfaces of the substrate. The surface layer includes inorganic grains having electrical insulating properties and a resin material that binds the inorganic grains to the surface of the substrate and binds the inorganic grains to each other. The resin material may have, for example, a three-dimensional network structure in which the material is fibrillated and the plurality of fibrils are connected to each other. The inorganic grains are supported on the resin material having the three-dimensional network structure. Further, the surface of the substrate and the inorganic grains may be bound to each other without the resin material being fibrillated. In this case, higher binding properties can be obtained. By providing a surface layer on one surface or both surfaces of the substrate as described above, oxidation resistance, heat resistance and mechanical strength of the separator 23 can be enhanced.

The substrate is a porous film through which lithium ions permeate and which is formed of an insulating film having a predetermined mechanical strength. Since an electrolytic solution is held in pores of the substrate, the substrate preferably has such characteristic properties as high resistance to the electrolytic solution, a low reactivity, and low expansibility.

As the material constituting the substrate, the resin material or the nonwoven fabric constituting the separator 23 described above can be used.

The inorganic grains include at least one selected from the group consisting of metal oxides, metal nitrides, metal carbides, metal sulfides and the like. As the metal oxides, aluminum oxide (alumina, $Al_2O_3$), boehmite (hydrated aluminum oxide), magnesium oxide (magnesia, MgO), titanium oxide (titania, $TiO_2$), zirconium oxide (zirconia, $ZrO_2$), silicon oxide (silica, $SiO_2$), yttrium oxide (itria, $Y_2O_3$) or the like can be preferably used. As the metal nitride, silicon nitride ($Si_3N_4$), aluminum nitride (AlN), boron nitride (BN), titanium nitride (TiN) and the Like can be preferably used. As the metal carbide, silicon carbide (SiC), boron carbide ($B_4C$) or the like can be preferably used. As the metal sulfide, barium sulfate ($BaSO_4$) or the like can be preferably used. Among the above-mentioned metal oxides, it is preferable to use alumina, titania (particularly those having a rutile structure), silica or magnesia, and it is more preferable to use alumina.

The inorganic grains may contain minerals such as porous aluminosilicates such as zeolite ($M_{2/n}O \cdot Al_2O_3 \cdot xSiO_2 \cdot yH_2O$, where M is a metallic element, $x \geq 2$, and $y \geq 0$), laminar silicates, barium titanate ($BaTiO_3$), or strontium titanate ($SrTiO_3$). The inorganic grains have oxidation resistance and heat resistance, and a surface layer of a side surface facing the positive electrode containing the inorganic grains has strong resistance to an oxidizing environment in the vicinity of the positive electrode during charging. The shape of the inorganic grains is not particularly limited, and any of a spherical shape, a plate shape, a fiber shape, a cubic shape, a random shape, and the like can be used.

The grain size of the inorganic grains is preferably in a range of 1 nm or more and 10 μm or less. This is because inorganic grains having a grain size less than 1 nm are difficult to obtain, if the grain size is more than 10 μm, a distance between the electrodes becomes large, and the active material cannot be filled in a limited space in a sufficient amount, so that the battery capacity is reduced.

Examples of the resin material constituting the surface layer include fluorine-containing resins such as polyvinylidene fluoride and polytetrafluoroethylene, fluorine-containing rubbers such as a vinylidene fluoride-tetrafluoroethylene copolymer and an ethylene-tetrafluoroethylene copolymer, rubbers such as a styrene-butadiene copolymer or a hydride thereof, an acrylonitrile-butadiene copolymer or a hydride thereof, an acrylonitrile-butadiene-styrene copolymer or a hydride thereof, a methacrylic acid ester-acrylic acid ester copolymer, a styrene-acrylic acid ester copolymer, an acrylonitrile-acrylic acid ester copolymer, an ethylene propylene rubber, polyvinyl alcohol, and polyvinyl acetate, cellulose derivatives such as ethylcellulose, methylcellulose, hydroxyethylcellulose, carboxymethylcellulose, polyphenylene ether, polysulfone, polyether sulfone, polyphenylene sulfide, polyether imide, polyimide, polyamide such as wholly aromatic polyamide (aramid), polyamideimide, polyacrylonitrile, polyvinyl alcohol, polyether, and a high heat resistant resin having at least one of a melting point and a glass transition temperature of 180° C. or higher, such as an acrylic acid resin or polyester. These resin materials may be used alone or in combination of two or more. Among them, a fluorine-based resin such as polyvinylidene fluoride is preferable from the viewpoint of oxidation resistance and flexibility, and it is preferable to contain aramid or polyamideimide from the viewpoint of heat resistance.

A method of forming the surface layer may include, for example, applying a slurry composed of a matrix resin, a solvent, and inorganic grains onto a substrate (porous membrane), and allowing the coated substrate to pass through a poor solvent of the matrix resin and a bath compatible with the above-described solvent, thereby causing phase separation, and then drying the resulting substrate.

The above-described inorganic grains may be contained as a substrate in the porous film. Further, the surface layer may not include inorganic grains and may be made only of a resin material.

The electrolytic solution is a so-called non-aqueous electrolytic solution, and contains an organic solvent (non-aqueous solvent) and an electrolyte salt dissolved in the organic solvent. In order to improve the battery characteristics, the electrolytic solution may contain known additives. Instead of the electrolytic solution, an electrolyte layer containing an electrolytic solution and a polymer compound serving as a holding material for holding the electrolytic solution therein may be used. In this case, the electrolyte layer may be in the form of a gel.

As the organic solvent, a cyclic carbonate such as ethylene carbonate or propylene carbonate can be used. It is preferable to use one of ethylene carbonate and propylene carbonate, and it is particularly preferable to mix both of these for use. This is because the cycle characteristics can be further improved.

In addition, as the organic solvent, it is preferable to mix a chain carbonate such as diethyl carbonate, dimethyl carbonate, ethylmethyl carbonate, or methyl propyl carbonate in addition to these cyclic carbonates. This is because high ionic conductivity can be obtained.

Further, the organic solvent preferably contains 2,4-difluoroanisole or vinylene carbonate. This is because 2,4-difluoroanisole can further improve the discharge capacity, and vinylene carbonate can further improve the cycle characteristics. Thus, use of these compounds in mixture is preferable because the discharge capacity and the cycle characteristics can be further improved.

In addition to these compounds, examples of the organic solvent include butylene carbonate, γ-butyrolactone, γ-valerolactone, 1,2-dimethoxyethane, tetrahydrofuran, 2-methyltetrahydrofuran, 1,3-dioxolane, 4-methyl-1,3-dioxolane, methyl acetate, methyl propionate, acetonitrile, glutaronitrile, adiponitrile, methoxy acetonitrile, 3-methoxy propylonitrile, N,N-dimethylformamide, N-methylpyrrolidinone, N-methyloxazolidinone, N,N-dimethylimidazolidinone, nitromethane, nitroethane, sulfolane, dimethyl sulfoxide, and trimethyl phosphate.

A compound obtained by replacing at least some hydrogen atoms in these organic solvents with fluorine atoms may be preferable because such a compound may improve reversibility of electrode reaction depending on the types of electrodes to be combined.

Examples of the electrolyte salt include lithium salts, and the lithium salts can be used singly or in mixture of two or more kinds thereof. Examples of the lithium salt include $LiPF_6$, $LiBF_4$, $LiAsF_6$, $LiClO_4$, $LiB(C_6H_5)_4$, $LiCH_3SO_3$, $LiCF_3SO_3$, $LiN(SO_2CF_3)_2$, $LiC(SO_2CF_3)_3$, $LiAlCl_4$, $LiSiF_6$, LiCl, lithium difluoro[oxolato-O,O']borate, lithium bis(oxalate)borate, and LiBr. Among these lithium salts, $LiPF_6$ is preferable because $LiPF_6$ can provide high ionic conductivity and can further improve cycle characteristics.

In the battery having the above-described configuration, when charging is performed, for example, lithium ions are extracted from the positive electrode active material layer 21B and inserted into the negative electrode active material layer 22B through the electrolytic solution. On the other hand, when discharging is performed, for example, lithium ions are extracted from the negative electrode active material layer 22B and inserted into the positive electrode active material layer 21B through the electrolytic solution.

Next, an example of a method of manufacturing a battery according to the second embodiment of the present invention will be described.

The positive electrode 21 is prepared as follows. First, for example, the positive electrode active material, a conductive agent and a binder are mixed to prepare a positive electrode mixture, and the positive electrode mixture is dispersed in a solvent such as N-methyl-2-pyrrolidone (NMP), thus producing a paste-like positive electrode mixture slurry. Then, the positive electrode mixture slurry is applied on the positive electrode current collector 21A, the solvent is dried, and the dried mixture is compression molded with a rolling press machine or the like, so that the positive electrode active material layer 21B is formed, and the positive electrode 21 is obtained.

The negative electrode 22 is prepared as follows. First, for example, a negative electrode active material and a binder are mixed to prepare a negative electrode mixture, and the negative electrode mixture is dispersed in a solvent such as N-methyl-2-pyrrolidone, thus producing a paste-like negative electrode mixture slurry. Then, the negative electrode mixture slurry is applied on the negative electrode current collector 22A, the solvent is dried, and the dried mixture is compression molded with a rolling press machine or the like, so that the negative electrode active material layer 22B is formed, and the negative electrode 22 is obtained.

The winding type electrode body 20 is produced as follows. First, the positive electrode lead 11 is attached to one end of the positive electrode current collector 21A by welding, and the negative electrode lead 12 is attached to one end of the negative electrode current collector 22A by welding. Next, the positive electrode 21 and the negative electrode 22 are wound around a flat winding core via the separator 23, wound many times in a longitudinal direction, and then the protective tape 24 is adhered to the outermost periphery to obtain the electrode body 20.

The electrode body 20 is sealed with the outer package material 10 as follows. Then, the electrode body 20 is sandwiched between the outer package materials 10, and the outer peripheral edges excluding one side are subjected to heat fusion to form a bag shape, and then the electrode body 20 is housed in the outer package material 10. At this time, the adhesive film 13 is inserted between the outer package material 10 and each of the positive electrode lead 11 and the negative electrode lead 12. The adhesive film 13 may be attached to the positive electrode lead 11 and the negative electrode lead 12 in advance. Next, the electrolytic solution is injected into the outer package material 10 from one unfused side, and then the unfused side is subjected to heat fusion in a vacuum atmosphere to be sealed. Accordingly, the battery shown in FIGS. 3 and 4 is obtained.

In the battery according to the second embodiment, since the positive electrode active material layer 21B contains the positive electrode active material according to the first embodiment, both the cycle characteristics and the storage characteristics can be achieved. In particular, both the cycle characteristics and the storage characteristics can be achieved in a high temperature environment.

When the positive electrode potential (vsLi/Li$^+$) of the battery in the fully charged state exceeds 4.20 V, in addition to the above-mentioned effects, both the cycle characteristics and the storage characteristics can be achieved.

In the third embodiment, an electronic device including the battery according to the second embodiment described above will be described.

Figure 5:
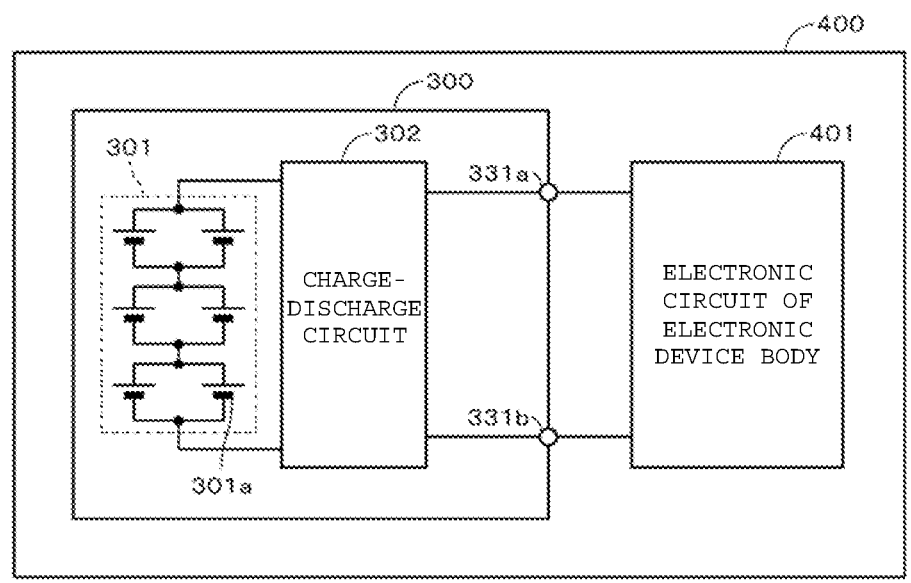
FIG. 5 is a block diagram showing an example of a configuration of an electronic device according to an embodiment of the present technology.

FIG. 5 shows an example of a configuration of an electronic device 400 according to the third embodiment of the present invention. The electronic device 400 includes an electronic circuit 401 of an electronic device body and a battery pack 300. The battery pack 300 is electrically connected to the electronic circuit 401 via a positive electrode terminal 331a and a negative electrode terminal 331b. The electronic device 400 may have a configuration in which the battery pack 300 is detachable.

Examples of the electronic device 400 include a notebook personal computer, a tablet computer, a mobile phone (for example, a smart phone), a personal digital assistant (PDA), a display device (for example, an LCD (Liquid Crystal Display), an EL (Electro Luminescence) display, or electronic paper), an imaging device (for example, a digital still camera or a digital video camera), an audio device (for example, a portable audio player), a game device, a cordless handset phone machine, an electronic book, an electronic dictionary, a radio, a headphone, a navigation system, a memory card, a pacemaker, a hearing aid, an electric tool, an electric shaver, a refrigerator, an air conditioner, a television, a stereo, a water heater, a microwave oven, a dishwasher, a washing machine, a dryer, a lighting device, a toy, a medical device, a robot, a load conditioner, and a traffic signal. However, the electronic device 400 is not limited thereto.

For example, the electronic circuit 401 includes a CPU (Central Processing Unit), a peripheral logic unit, an interface unit, and a storage unit, and controls the entire electronic device 400.

The battery pack 300 includes an assembled battery 301 and a charge-discharge circuit 302. The battery pack 300 may further include an outer package material (not shown) that houses the assembled battery 301 and the charge-discharge circuit 302, if necessary.

The assembled battery 301 is formed by connecting a plurality of secondary batteries 301a to each other in series and/or in parallel. For example, the plurality of secondary batteries 301a are connected to each other inn parallel m series (each of n and m is a positive integer). FIG. 5 shows an example in which six secondary batteries 301a are connected to each other in 2 parallel 3 series (2P3S). As the secondary battery 301a, the battery according to the second embodiment described above is used.

In this embodiment, the case where the battery pack 300 includes the assembled battery 301 formed by the plurality of secondary batteries 301a will be described. However, the battery pack 300 may include the single secondary battery 301a instead of the assembled battery 301.

The charge-discharge circuit 302 is a controller that controls charging and discharging of the assembled battery 301. Specifically, during charging, the charge-discharge circuit 302 controls charging to the assembled battery 301. On the other hand, during discharging (that is, during use of the electronic device 400), the charge-discharge circuit 302 controls discharging to the electronic device 400.

As the outer package material, for example, a case made of a metal, a polymer resin, a composite material thereof, or the like can be used. Examples of the composite material include a laminate in which a metal layer and a polymer resin layer are stacked.

Hereinafter, the present invention will be described specifically with examples, but the present invention is not limited only to the examples.

Example 1

(Process (1))

First, commercially available lithium carbonate, cobalt oxide, aluminum hydroxide, and magnesium carbonate were mixed with each other in such a manner that a molar ratio of Li, Co, Mg and Al was 1.02:0.99:0.005:0.005, and thus a mixture was obtained. Next, this mixture was fired in air at 1000° C. for 6 hours and slow-cooled to obtain a powder of Mg and Al-containing $LiCoO_2$ particles having an average particle size of 20 μm and a specific surface area of 0.3 m²/g.

(Process (2))

First, commercially available lithium carbonate, cobalt oxide, magnesium carbonate, aluminum hydroxide, and titanium oxide were mixed with each other in such a manner that a molar ratio of Li, Co, Mg, Al and Ti was 1.02:0.85: 0.05:0.05:0.05, and thus a mixture was obtained. Next, 5% by mass of this mixture was added to 95% by mass of the powder of $LCO_2$ particles (base material) obtained in the process (1), treated with a high-speed stirrer for 3 hours, then fired at 800° C. under an air stream for 3 hours, and finely pulverized with a ball mill. As a result, a powder of positive electrode active material particles in which Mg, Al and Ti were present on the surface at high concentrations was obtained.

Example 2-1

A powder of positive electrode active material particles in which Mg, Al, and Ti were present on the surface at high concentrations was obtained in the same manner as in Example 1 except that the treatment time with the high-speed stirrer in the process (2) was 2 hours.

Example 2-2

A powder of positive electrode active material particles in which Mg, Al, and Ti were present on the surface at high concentrations was obtained in the same manner as in Example 1 except that the treatment time with the high-speed stirrer in the process (2) was 5 hours.

Example 3-1

A powder of positive electrode active material particles in which Mg, Al, and Ti were present on the surface at high concentrations was obtained in the same manner as in Example 1 except that the firing temperature in the process (2) was 750° C.

Example 3-2

A powder of positive electrode active material particles in which Mg, Al, and Ti were present on the surface at high concentrations was obtained in the same manner as in Example 1 except that the firing temperature in the process (2) was 850° C.

Example 4-1

A powder of positive electrode active material particles in which Mg, Al, and Ti were present on the surface at high concentrations was obtained in the same manner as in Example 1 except that the molar ratio of Li, Co, Mg, Al, and Ti in the process (2) was 1.02:0.79:0.07:0.07:0.07.

Example 4-2

A powder of positive electrode active material particles in which Mg, Al, and Ti were present on the surface at high concentrations was obtained in the same manner as in Example 1 except that the molar ratio of Li, Co, Mg, Al, and Ti in the process (2) was 1.02:0.91:0.03:0.03:0.03.

Example 5

A powder of positive electrode active material particles in which Al and Ti were present on the surface at high concentrations was obtained in the same manner as in Example 1 except that in the process (2), commercially available lithium carbonate, cobalt oxide, aluminum hydroxide, and titanium oxide were mixed with each other in such a manner that a molar ratio of Li, Co, Al and Ti was 1.02:0.90:0.05:0.05, and thus a mixture was obtained.

Example 6

A powder of positive electrode active material particles in which Mg and Al were present on the surface at high concentrations was obtained in the same manner as in Example 1 except that in the process (2), commercially available lithium carbonate, cobalt oxide, magnesium carbonate, and aluminum hydroxide were mixed with each other in such a manner that a molar ratio of Li, Co, Mg and Al was 1.02:0.90:0.05:0.05, and thus a mixture was obtained.

Example 7

A powder of positive electrode active material particles in which Mg and Ti were present on the surface at high concentrations was obtained in the same manner as in Example 1 except that in the process (2), commercially available lithium carbonate, cobalt oxide, magnesium carbonate, and titanium oxide were mixed with each other in such a manner that a molar ratio of Li, Co, Mg and Ti was 1.02:0.90:0.05:0.05, and thus a mixture was obtained.

Example 8

A powder of positive electrode active material particles in which Al was present on the surface at a high concentration was obtained in the same manner as in Example 1 except that in the process (2), commercially available lithium carbonate, cobalt oxide, and aluminum hydroxide were mixed with each other in such a manner that a molar ratio of Li, Co, and Al was 1.07:0.95:0.05, and thus a mixture was obtained.

Example 9

A powder of positive electrode active material particles in which Ti was present on the surface at a high concentration was obtained in the same manner as in Example 1 except that in the process (2), commercially available lithium carbonate, cobalt oxide, and titanium oxide were mixed with each other in such a manner that a molar ratio of Li, Co, and Ti was 1.02:0.95:0.05, and thus a mixture was obtained.

Example 10

A powder of positive electrode active material particles in which Mg was present on the surface at a high concentration was obtained in the same manner as in Example 1 except that in the process (2), commercially available lithium carbonate, cobalt oxide, and magnesium carbonate were mixed with each other in such a manner that a molar ratio of Li, Co, and Mg was 1.02:0.95:0.05, and thus a mixture was obtained.

Example 11

A powder of positive electrode active material particles in which Mg, Al, and Ti were present on the surface at high concentrations and P was also present on the surface was obtained in the same manner as in Example 1 except that lithium phosphate was used instead of lithium carbonate in the process (2).

Example 12

A powder of positive electrode active material particles in which Mg, Al, and Ti were present on the surface at high concentrations and F was also present on the surface was obtained in the same manner as in Example 1 except that lithium fluoride was used instead of lithium carbonate in the process (2).

Example 13

A powder of positive electrode active material particles in which Mg, Al, and Ti were present on the surface at high concentrations and S was also present on the surface was obtained in the same manner as in Example 1 except that lithium sulfide was used instead of lithium carbonate in the process (2).

Example 14

A powder of positive electrode active material particles in which Mg, Al, and Ti were present on the surface at high concentrations was obtained in the same manner as in Example 1 except that in the process (2), 1200 ppm of LiAlMg-containing cobalt oxide prepared by the method shown below was mixed during the treatment with a high-speed stirrer.

Amounts corresponding to 50 parts by mass of lithium carbonate, 1 part by mass of magnesium oxide, and 1 part by mass of aluminum oxide based on 100 parts by mass of cobalt carbonate were mixed, then fired at 800° C. under an air stream for 3 hours, and finely pulverized with a ball mill, and thus LiMgAl-containing cobalt oxide was synthesized. When the obtained fine powder was analyzed by XRD (X-ray diffraction), it was confirmed that the fine powder had a spinel phase.

Comparative Example 1

In the process (1), commercially available lithium carbonate and cobalt oxide were mixed with each other in such a manner that a molar ratio of Li and Co was 1.02:1.00, and thus a mixture was obtained. In the process (2), commercially available lithium carbonate and cobalt oxide were mixed with each other in such a manner that the molar ratio of Li and Co was 1.02:1.00, and thus a mixture was obtained. A powder of positive electrode active material particles was obtained in the same manner as in Example 1 except for the above.

Comparative Example 2-1

A powder of positive electrode active material particles in which Mg, Al, and Ti were present on the surface at high concentrations was obtained in the same manner as in Example 1 except that the treatment time with the high-speed stirrer in the process (2) was 1 hour.

Comparative Example 2-2

A powder of positive electrode active material particles in which Mg, Al, and Ti were present on the surface at high concentrations was obtained in the same manner as in Example 1 except that the treatment time with the high-speed stirrer in the process (2) was 10 hours.

Comparative Example 3-1

A powder of positive electrode active material particles in which Mg, Al, and Ti were present on the surface at high concentrations was obtained in the same manner as in Example 1 except that the firing temperature in the process (2) was 700° C.

Comparative Example 3-2

A powder of positive electrode active material particles in which Mg, Al, and Ti were present on the surface at high concentrations was obtained in the same manner as in Example 1 except that the firing temperature in the process (2) was 900° C.

Comparative Example 4-1

A powder of positive electrode active material particles in which Mg, Al, and Ti were present on the surface at high concentrations was obtained in the same manner as in Example 1 except that the molar ratio of Li, Co, Mg, Al, and Ti in the process (2) was 1.02:0.80:0.1:0.1:0.1.

Comparative Example 4-2

A powder of positive electrode active material particles in which Mg, Al, and Ti were present on the surface at high concentrations was obtained in the same manner as in Example 1 except that the molar ratio of Li, Co, Mg, Al, and Ti in the process (2) was 1.02:0.98:0.01:0.01:0.01.

The powder of the positive electrode active material particles obtained as described above was evaluated as follows.

First, a scanning X-ray photoelectron spectrometer (Quantera SXM) manufactured by ULVAC-PHI, INCORPORATED. was used as a measuring device, and measurement was performed under the following measurement conditions. X-ray source: Monochromatized Al—Kα (1486.6 eV)

X-ray spot diameter: 100 μm

Next, from peak areas of all detected elements, a surface atomic concentration was calculated using a relative sensitivity factor provided by ULVAC-PHI, INCORPORATED., and an atomic ratio (total amount of M1/Co amount) of a total amount of the element M1 (at least one element M1 of Mg, Al and Ti) to the amount of Co was calculated.

First, RAMAN-11 manufactured by Nanophoton Corporation was used as a measuring device, and the Raman spectrum was measured under the following measurement conditions. Excitation laser wavelength: 532 nm Excitation laser output: 0.26 mW (optical line shaping mode)

Objective lens used: 50 times

NA: 0.8

Confocal slit width: 100 μm

Next, in the measured Raman spectrum (see FIG. 2), the half-value width (FWHM) of the peak of the $A_{1g}$ vibration mode of the hexagonal crystal structure was calculated by Gaussian fitting. Further, the peak intensity ratio $IA_{1g\text{-}H}/IE_g$ of the peak intensity $IA_{1g\text{-}H}$ of the $A_{1g}$ vibration mode of the hexagonal crystal structure and the peak intensity $IE_g$ of the $E_g$ vibration mode of the hexagonal crystal structure was calculated. Furthermore, the peak intensity ratio $IA_{1g\text{-}S}/IA_{1g\text{-}H}$ of the peak intensity $IA_{1g\text{-}S}$ of the $A_{1g}$ vibration mode of the spinet phase in the Raman spectrum and the peak intensity $IA_{1g\text{-}H}$ of the $A_{1g}$ vibration mode of the hexagonal crystal structure was calculated.

Using the powder of the positive electrode active material particles obtained as described above, a battery was produced as follows.

The positive electrode was prepared as follows. First, a positive electrode mixture was prepared by mixing 98% by weight of positive electrode active material (powder of positive electrode active material particles), 0.8% by weight of amorphous carbon powder (Ketjen black), and 1.2% by weight of polyvinylidene fluoride (PVdF). Subsequently, this positive electrode mixture was dispersed in N-methyl-2-pyrrolidone (NMP) to prepare a positive electrode mixture slurry, and then the positive electrode mixture slurry was uniformly applied to a positive electrode current collector made of a band-shaped aluminum foil to form a coating layer. Next, the coating layer was dried with warm air, then punched to φ15 mm and subjected to compression molding with a hydraulic press machine, whereby a positive electrode was prepared.

The negative electrode was prepared as follows. First, 95% by weight of graphite powder and 5% by weight of PVdF were mixed to prepare a negative electrode mixture. Next, this negative electrode mixture was dispersed in N-methyl-2-pyrrolidone to prepare a negative electrode mixture slurry, and then the negative electrode mixture slurry was uniformly applied to a negative electrode current collector made of a band-shaped copper foil to form a coating layer. Next, the coating layer was dried with warm air, then punched to φ16 mm and subjected to compression molding with a hydraulic press machine, whereby a negative electrode was prepared.

Using the positive electrode and the negative electrode prepared as described above, a battery was produced as follows. First, an electrode body was prepared by stacking a positive electrode and a negative electrode with a porous polyolefin film interposed therebetween. Subsequently, ethylene carbonate and propylene carbonate were mixed such that a volume mixing ratio was 1:1 to prepare a mixed solution. Next, $LiPF_6$ was dissolved in this mixed solution to a concentration of 1 mol/dm$^3$ to prepare a non-aqueous electrolytic solution. Finally, a CR2032 coin-type battery was produced using the above-mentioned electrode body and electrolytic solution.

A cycle retention (cycle characteristics) of the battery produced as described above was determined as follows. First, the battery was charged under conditions of an environmental temperature of 45° C., a charging voltage of 4.40 V, a charging current of 10 mA, and a charging time of 2.5 hours, and then discharged under conditions of a discharge current of 9 mA and a final voltage of 3.0 V, and an initial discharge capacity was measured. Next, charging and discharging were repeated under the same charging and discharging conditions as when the initial discharge capacity was determined. The discharge capacity at the 500th cycle was measured, and the cycle retention with respect to the initial discharge capacity was calculated by the following formula: "cycle retention" (%)=("500th cycle discharge capacity"/"initial discharge capacity")×100(%)

First, a battery was produced as in the evaluation of the cycle characteristics evaluation described above. Subsequently, the produced battery was charged under the same charging conditions as when the initial discharge capacity was determined in the above-mentioned cycle characteristics evaluation, and stored at an environmental temperature of 60° C. for 14 days. After storage, the battery was discharged under the same discharging conditions as when the initial discharge capacity was determined in the above-mentioned cycle characteristics evaluation. The discharge capacity after storage at 60° C. for 14 days was measured, and a storage retention for the initial discharge capacity was calculated by the following formula. The initial discharge capacity was determined as in the cycle characteristics evaluation described above. "Storage retention" (%)=("discharge capacity after storage at 60° C. for 14 days"/"initial discharge capacity")×100(%)

Next, the battery after storage was disassembled, and the negative electrode was taken out. Subsequently, the taken-out negative electrode was boiled in 15 ml of 1M hydrochloric acid for 15 minutes, the solution was filtered, and the concentration of Co contained in the solution was measured by a sequential ICP emission spectrophotometer (SPS3100, manufactured by Hitachi High-Tech Science Corporation). Then, the amount of Co eluted during storage was measured from the following formula: Co elution amount=(Co concentration)/(weight of active material contained in positive electrode).

Next, the measured Co elution amount of each Example and each Comparative Example was converted into a relative value with the Co elution amount of Example 5 defined as 100.

Table 1 shows the configurations and evaluation results of the positive electrode active materials of Examples 1 to 14 and Comparative Examples 1 to 4-2.

TABLE 1

| | BASE MATERIAL M1 | ACTIVE MATERIAL SURFACE M1 | M2 | ATOMIC RATIO M1/Co | $A_{1g}$ A1G HALF VALUE WIDTH (cm$^{-1}$) | PEAK INTENSITY RATIO $IA_{1g\text{-}H}/IE_g$ | PEAK INTENSITY RATIO $IA_{1g\text{-}S}/IA_{1g\text{-}H}$ | CYCLE RETENTION (%) | STORAGE RETENTION (%) | ELUTION (−) |
|---|---|---|---|---|---|---|---|---|---|---|
| EXAMPLE 1 | Mg, Al | Mg, Al, Ti | — | 0.77 | 14.1 | 1.50 | <0.04 | 90 | 90 | 89 |
| EXAMPLE 2-1 | Mg, Al | Mg, Al, Ti | — | 0.82 | 13.2 | 1.15 | <0.04 | 82 | 85 | 90 |
| EXAMPLE 2-2 | Mg, Al | Mg, Al, Ti | — | 0.73 | 14.6 | 1.87 | <0.04 | 87 | 78 | 113 |
| EXAMPLE 3-1 | Mg, Al | Mg, Al, Ti | — | 0.74 | 10.3 | 1.45 | <0.04 | 83 | 84 | 86 |
| EXAMPLE 3-2 | Mg, Al | Mg, Al, Ti | — | 0.75 | 16.7 | 1.54 | <0.04 | 88 | 77 | 115 |
| EXAMPLE 4-1 | Mg, Al | Mg, Al, Ti | — | 1.24 | 14.9 | 1.58 | <0.04 | 83 | 83 | 91 |
| EXAMPLE 4-2 | Mg, Al | Mg, Al, Ti | — | 0.61 | 15.3 | 1.63 | <0.04 | 89 | 77 | 115 |
| EXAMPLE 5 | Mg, Al | Al, Ti | — | 1.03 | 13.5 | 1.58 | <0.04 | 89 | 82 | 100 |
| EXAMPLE 6 | Mg, Al | Mg, Al | — | 0.94 | 13.1 | 1.56 | <0.04 | 88 | 85 | 80 |
| EXAMPLE 7 | Mg, Al | Mg, Ti | — | 1.05 | 12.5 | 1.63 | <0.04 | 83 | 81 | 85 |
| EXAMPLE 8 | Mg, Al | Al | — | 1.23 | 12.4 | 1.31 | <0.04 | 82 | 75 | 85 |
| EXAMPLE 9 | Mg, Al | Ti | — | 0.81 | 14.8 | 1.65 | <0.04 | 85 | 85 | 117 |
| EXAMPLE 10 | Mg, Al | Mg | — | 0.92 | 12.6 | 1.55 | <0.04 | 81 | 82 | 88 |
| EXAMPLE 11 | Mg, Al | Mg, Al, Ti | P | 1.12 | 16.3 | 1.63 | <0.04 | 91 | 81 | 103 |
| EXAMPLE 12 | Mg, Al | Mg, Al, Ti | F | 0.98 | 15.7 | 1.62 | <0.04 | 93 | 82 | 105 |
| EXAMPLE 13 | Mg, Al | Mg, Al, Ti | S | 0.99 | 14.7 | 1.52 | <0.04 | 92 | 81 | 107 |
| EXAMPLE 14 | Mg, Al | Mg, Al, Ti | — | 0.99 | 15.7 | 1.56 | 0.05 | 76 | 70 | 155 |
| COMPARATIVE EXAMPLE 1 | NONE | NONE | — | — | 14.3 | 1.59 | <0.04 | 49 | 43 | 300 |
| COMPARATIVE EXAMPLE 2-1 | Mg, Al | Mg, Al, Ti | — | 1.03 | 16.2 | 0.91 | <0.04 | 83 | 66 | 150 |
| COMPARATIVE EXAMPLE 2-2 | Mg, Al | Mg, Al, Ti | — | 1.09 | 15.8 | 2.21 | <0.04 | 57 | 75 | 104 |
| COMPARATIVE EXAMPLE 3-1 | Mg, Al | Mg, Al, Ti | — | 1.08 | 9.8 | 1.49 | <0.04 | 58 | 81 | 121 |
| COMPARATIVE EXAMPLE 3-2 | Mg, Al | Mg, Al, Ti | — | 1.1 | 18.9 | 1.61 | <0.04 | 82 | 50 | 250 |
| COMPARATIVE EXAMPLE 4-1 | Mg, Al | Mg, Al, Ti | — | 1.41 | 13.1 | 1.55 | <0.04 | 69 | 79 | 105 |
| COMPARATIVE EXAMPLE 4-2 | Mg, Al | Mg, Al, Ti | — | 0.52 | 12.1 | 1.51 | <0.04 | 60 | 65 | 189 |

In Table 1, in the column of the evaluation result of the peak intensity ratio $IA_{1g\text{-}S}/IA_{1g\text{-}H}$, the notation of "<0.04" means "$IA_{1g\text{-}S}/IA_{1g\text{-}H}$<0.04".

The following can be seen from the above evaluation results. Since the positive electrode active materials of Examples 1 to 14 have the following configurations (1) to (4), a high cycle retention, a high storage retention, and a reduction in Co elution can be achieved in a high temperature environment. That is, both the cycle characteristics and the storage characteristics can be achieved in a high temperature environment. (1) The lithium transition metal composite oxide includes Li, Co, and at least one element M1 selected from the group consisting of Mg, Al, and Ti, and the at least one element M1 is present on the surface of the positive electrode active material particles. (2) The atomic ratio (total amount of at least one element M1 described above/Co amount) of the amount of Co on the surface of the particles and the total amount of at least one element M1 described above is 0.6 or more and 1.3 or less. (3) The half-value width of the peak of the $A_{1g}$ vibration mode of the hexagonal crystal structure in the Raman spectrum is 10 cm$^{-1}$ or more and 17 cm$^{-1}$ or less. (4) The peak intensity ratio $IA_{1g\text{-}H}/IE_g$ of the peak intensity $IA_{1g\text{-}H}$ of the $A_{1g}$ vibration mode of the hexagonal crystal structure in the Raman spectrum and the peak intensity $IE_g$ of the $E_g$ vibration mode of the hexagonal crystal structure is 1.1 or more and 1.9 or less.

Since the positive electrode active materials of Examples 1 to 13 further have the following configuration (5) in addition to the above configurations (1) to (4), the cycle characteristics and the storage characteristics in a high temperature environment can be further improved. (5) The peak intensity ratio $IA_{1g-S}/IA_{1g-H}$ of the peak intensity $IA_{1g-S}$ of the $A_{1g}$ vibration mode of the spinel phase in the Raman spectrum and the peak intensity $IA_{1g-H}$ of the $A_{1g}$ vibration mode of the hexagonal crystal structure is 0.04 or less.

On the other hand, since the positive electrode active materials of Comparative Examples 1 to 4-2 do not have at least one of the above configurations (1) to (4), the cycle characteristics and the storage characteristics cannot be simultaneously achieved in a high temperature environment.

The first to third embodiments of the present invention have been specifically described above; however, the present invention is not limited to the above-described first to third embodiments. Various modifications of the present invention can be made based on the technical spirit of the present invention.

For example, the configurations, the methods, the processes, the shapes, the materials, the numerical values, and the like mentioned in the above-described first to third embodiments are merely examples. Different configurations, methods, processes, shapes, materials, numerical values, and the like may be used as necessary.

The configuration, the methods, the processes, the shapes, the materials, the numerical values and the like in the above-described embodiments may be combined insofar as they are not departing from the spirit of the present invention.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A positive electrode active material comprising a positive electrode active material particle including a composite oxide with a hexagonal crystal structure,
   wherein the composite oxide includes Li, Co, and at least one element M1 selected from the group consisting of Ni, Fe, Pb, Mg, Al, K, Na, Ca, Si, Ti, Sn, V, Ge, Ga, B, As, Zr, Mn and Cr,
   the at least one element M1 is provided on a surface of the positive electrode active material particle,
   an atomic ratio of a total amount of the at least one element M1 to an amount of Co on the surface of the positive electrode active material particle is from 0.6 to 1.3,
   a half-value width of a peak of an $A_{1g}$ vibration mode of the hexagonal crystal structure in a Raman spectrum is from 10 cm$^{-1}$ to 17 cm$^{-1}$, and
   a peak intensity ratio $IA_{1g-H}/IE_g$ of a peak intensity $IA_{1g-H}$ of the $A_{1g}$ vibration mode of the hexagonal crystal structure in the Raman spectrum to a peak intensity $IE_g$ of an $E_g$ vibration mode of the hexagonal crystal structure is from 1.1 to 1.9.

2. The positive electrode active material according to claim 1, wherein
   the positive electrode active material particle further includes a spinel phase including the at least one element M1, and
   the spinel phase is provided on the surface of the positive electrode active material particle.

3. The positive electrode active material according to claim 2, wherein a peak intensity ratio $IA_{1g-S}/IA_{1g-H}$ of a peak intensity $IA_{1g-S}$ of the $A_{1g}$ vibration mode of the spinel phase in the Raman spectrum to the peak intensity $IA_{1g-H}$ of the $A_{1g}$ vibration mode of the hexagonal crystal structure is 0.04 or less.

4. The positive electrode active material according to claim 1, wherein the element M1 includes at least one selected from the group consisting of Mg, Al, and Ti.

5. The positive electrode active material according to claim 1, wherein
   the positive electrode active material particle further includes a compound including an element M2, and
   the element M2 includes at least one selected from the group consisting of S, P, and F.

6. The positive electrode active material according to claim 1, wherein the composite oxide is represented by formula (1):

$$Li_xCo_yM1_{1-y}O_2 \qquad (1)$$

wherein M1 includes at least one element selected from the group consisting of Ni, Fe, Pb, Mg, Al, K, Na, Ca, Si, Ti, Sn, V, Ge, Ga, B, As, Zr, Mn and Cr, and x and y satisfy 0.95≤x≤1.0 and 0<y<1.

7. A battery comprising:
   the positive electrode including the positive electrode active material according to claim 1;
   a negative electrode; and
   an electrolyte.

* * * * *